US009858125B2

(12) United States Patent
Bose et al.

(10) Patent No.: US 9,858,125 B2
(45) Date of Patent: Jan. 2, 2018

(54) SYSTEM AND METHOD FOR OPTIMIZING MIGRATION OF VIRTUAL MACHINES AMONG PHYSICAL MACHINES

(75) Inventors: Sumit Kumar Bose, Poorvi (IN); Srikanth Sundarrajan, Chennai (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/615,600

(22) Filed: Sep. 14, 2012

(65) Prior Publication Data

US 2013/0073731 A1 Mar. 21, 2013

(30) Foreign Application Priority Data

Sep. 20, 2011 (IN) .......................... 3241/CHE/2011

(51) Int. Cl.
*G06F 15/16* (2006.01)
*G06F 9/50* (2006.01)

(52) U.S. Cl.
CPC .................................. *G06F 9/5088* (2013.01)

(58) Field of Classification Search
CPC ..................................................... G06F 9/5088
USPC ......................................................... 709/226
See application file for complete search history.

(56) References Cited

U.S. PATENT DOCUMENTS

| 8,095,929 | B1 * | 1/2012 | Ji | G06F 9/4856 709/223 |
| 8,230,069 | B2 * | 7/2012 | Korupolu | 709/226 |
| 2007/0130424 | A1 * | 6/2007 | Hashimoto et al. | 711/114 |
| 2007/0174658 | A1 * | 7/2007 | Takamoto et al. | 714/4 |
| 2008/0256307 | A1 * | 10/2008 | Fujimoto | 711/154 |
| 2009/0328050 | A1 * | 12/2009 | Liu et al. | 718/104 |
| 2010/0162259 | A1 * | 6/2010 | Koh et al. | 718/104 |
| 2011/0161491 | A1 * | 6/2011 | Sekiguchi | 709/224 |
| 2011/0271071 | A1 * | 11/2011 | Nakatogawa | G06F 3/061 711/165 |
| 2012/0011254 | A1 * | 1/2012 | Jamjoom et al. | 709/226 |

OTHER PUBLICATIONS

Biazzo, "Approaches to Business Process Analysis: A Review", 2000, Business Process Management Journal, vol. 6, No. 2, pp. 99-112.

(Continued)

*Primary Examiner* — Bryan Lee
*Assistant Examiner* — Oluwatosin Gidado
(74) *Attorney, Agent, or Firm* — LeClairRyan, a Professional Corporation

(57) ABSTRACT

A system and method of selectively migrating at least one virtual machine to another physical machine is disclosed. Consumption information of a plurality of virtual machines and capacity information of a plurality of physical machines is retrieved. A first virtual machine to be potentially migrated is identified based on a consumption metric representing consumption of at least one resource dimension by the first virtual machine running on a first physical machine. A second physical machine to potentially accept migration of the first virtual machine is identified based on time window information, wherein an available capacity of the second physical machine is analyzed to determine if the first virtual machine's resource consumption exceeds the capacity of the second physical machine. The first virtual machine is migrated to the second physical machine if the first virtual machine's resource consumption does not exceed the available capacity of the second physical machine.

21 Claims, 11 Drawing Sheets

(56) References Cited

OTHER PUBLICATIONS

Blechar, "Magic Quadrant for Business Process Analysis Tools", Sep. 23, 2008. Gartner, pp. 1-27.
Cheung, et. al., "Process Analysis Techniques and Tools for Business Improvements", 1998, Business Process Management Journal, vol. 4, pp. 274-290.
Crowston, "A Coordination Theory Approach to Organizational Process Design", 1997, Organization Science, vol. 8, Issue 2, pp. 157-175.
Dalal, et. al., "Toward an Integrated Framework for Modeling Enterprise Processes", Mar. 2004, Communications of the ACM, vol. 47, No. 3, pp. 83-87.
Davenport, et. al., "The New Industrial Engineering: Information Technology and Business Process Design", Jun. 1990, Sloan Management Review, vol. 31, No. 4, pp. 1-31.
Datta, et. al., "Automating the Discovery of AS-IS Business Process Models" Probabilistic and Algorithmic Approaches, Sep. 1998, Information Systems Research, vol. 9, Issue 3, pp. 275-301.
Davenport, et. al., "Reengineering: Business Change of Mythic Proportions?", Jun. 1994, MIS Quarterly, pp. 121-127.

\* cited by examiner

| PM \ VM | VM₁ | VM₂ | VM₃ | VM₄ | VM₅ | VM₆ | VM₇ | PM Index |
|---|---|---|---|---|---|---|---|---|
| PM₁ | 0 | 0 | 1 | 0 | 1 | 0 | 0 | (2) |
| PM₂ | 0 | 1 | 1 | 1 | 0 | 1 | 1 | (5) |
| PM₃ | 1 | 1 | 0 | 0 | 1 | 0 | 0 | (3) |
| PM₄ | 0 | 0 | 0 | 1 | 0 | 0 | 0 | (1) |
| DPM₅ | | | | | | | | |
| DPM₆ | | | | | | | | |
| DPM₇ | | | | | | | | |
| VM Index | (1) | (2) | (2) | (2) | (2) | (1) | (1) | |

FIG. 6A

SYSTEM AND METHOD FOR OPTIMIZING MIGRATION OF VIRTUAL MACHINES AMONG PHYSICAL MACHINES

RELATED APPLICATION

The present application claims the benefit of priority under 35 U.S.C. 119 to Indian Patent Application Serial No. 3241/CHE/2011, filed Sep. 20, 2011, and entitled "System and Method for Optimizing Migration of Virtual Machines Among Physical Machines", all commonly owned herewith.

FIELD

The present disclosure relates to a system and method for optimizing migration of virtual machines among physical machines.

BACKGROUND

Server or system virtualization is a technology that enables partitioning of a physical machine into several equivalent virtual machines capable of hosting independent operating system instances. Several server virtualization capabilities such as virtual resource management, automated provisioning capability and live migration are worthy of taking note in this context.

A virtualized infrastructure provides an optimized operating environment that is malleable to suit varying demands Service providers who host applications and servers for their customers use grid technology to implement an optimized multi-tenant hosting environment. More crucially, guaranteeing Quality of Service (QoS) and consequently adhering to the Service Level Agreement (SLA) for these applications is even more challenging. Besides the load balancing, monitoring, scheduling and resource allocation capabilities of grid solutions, there is need for powerful provisioning, resource management, application level monitoring and SLA conformance mechanisms.

Transient load surges and global synchronization of peak load on certain classes of applications causes them to perform poorly, which in effect, adversely affects the QoS guarantees. Grid schedulers do very little to manage the application on a continuous basis. This is where live migration capability of virtualization can come in handy. If an application is wrapped as a VM and is scheduled as such instead of being allocated directly to the PM, live migration capabilities of virtualization technologies can be leveraged to move out the application to a location, where there is a higher likelihood of QoS conformance.

There have been attempts to address application QoS service issues on virtualized environment, whereby these solutions migrate the applications to lesser-utilized servers whenever there is a sustained breach in application's QoS. This phenomenon is termed as 'event-based' migration. While 'event-based' migration helps at solving the issue in the near term, it could easily lead to sub-optimal allocation, which in turn can cause a slew of migration activity.

SUMMARY

In an aspect, a method of selectively migrating at least one virtual machine to another physical machine in a plurality of physical machines is disclosed. The method comprises receiving, from a database, consumption information of a plurality of virtual machines and capacity information of a plurality of physical machines. The method comprises identifying, using one or more processors, a first virtual machine to be potentially migrated based on a consumption metric representing consumption of at least one resource dimension by the first virtual machine on running on a first physical machine. The method comprises identifying, using the one or more processors, a second physical machine to potentially accept migration of the first virtual machine based on time window information, wherein an available capacity of the second physical machine is analyzed to determine if the first virtual machine's resource consumption exceeds the capacity of the second physical machine. The method comprises migrating the first virtual machine to the second physical machine if it is determined by the one or more processors that the first virtual machine's resource consumption does not exceed the available capacity of the second physical machine.

In an aspect, a non-transitory machine readable medium having stored thereon instructions for migrating at least one virtual machine to another physical machine in a plurality of physical machines is disclosed. The medium comprising machine executable code which when executed by at least one machine, causes the machine to: receive, from a database, consumption information of a plurality of virtual machines and capacity information of a plurality of physical machines. The machine is configured to identify a first virtual machine to be potentially migrated based on a consumption metric representing consumption of at least one resource dimension by the first virtual machine on running on a first physical machine. The machine is configured to identify a second physical machine to potentially accept migration of the first virtual machine based on time window information, wherein an available capacity of the second physical machine is analyzed to determine if the first virtual machine's resource consumption exceeds the capacity of the second physical machine. The machine is configured to migrate the first virtual machine to the second physical machine if it is determined by the one or more processors that the first virtual machine's resource consumption does not exceed the available capacity of the second physical machine.

In an aspect, a computer system comprises a network interface configured to allow communications between the computing system and one or more network devices; a memory; and a processor coupled to the network interface and the memory. The processor is operative to: receive, from the memory, consumption information of a plurality of virtual machines and capacity information of a plurality of physical machines. The processor is operative to identify a first virtual machine to be potentially migrated based on a consumption metric representing consumption of at least one resource dimension by the first virtual machine on running on a first physical machine. The processor is operative to identify a second physical machine to potentially accept migration of the first virtual machine based on time window information, wherein an available capacity of the second physical machine is analyzed to determine if the first virtual machine's resource consumption exceeds the capacity of the second physical machine. The processor is operative to migrate the first virtual machine to the second physical machine if it is determined by the one or more processors that the first virtual machine's resource consumption does not exceed the available capacity of the second physical machine.

In one or more aspects, when identifying the first virtual machine, a cost metric associated with migrating the first virtual machine from the first physical machine to another physical machine is identified. Also a K ratio is calculated of the first virtual machine, wherein the K ratio at least partially takes into account the cost metric of the first virtual machine and the consumption metric associated with consumption of the at least one resource dimension.

In one or more aspects, K ratios iteratively calculated for one or more additional virtual machines of the plurality of virtual machines running on the first physical machine. A first list of proposed virtual machines running on the first physical machine to be considered for migration is generated, wherein the proposed virtual machines are ordered in the list based on their respective K ratios. In one or more aspects, K ratios for one or more virtual machines of the plurality of virtual machines running on the second physical machine are calculated. A second list of proposed virtual machines running on the second physical machine to be considered for migration is generated, wherein the proposed virtual machines are ordered in the list based on their respective K ratios.

In one or more aspects, when identifying the second physical machine the available capacity of the second physical machine is calculated by performing a tentative removal of one or more of the virtual machines in the second generated list from the second physical machine. It is determined whether the second physical machine has capacity to accept at least the first virtual machine for migration.

In one or more aspects, the second physical machine is removed from consideration upon determining that the second physical machine does not have capacity to accept at least the first virtual machine for migration.

In one or more aspects, the second physical machine is assigned to a target list of available of physical machines to accept one or more virtual machines for migration thereto.

In one or more aspects, the target list of available physical machines includes a plurality of available physical machines. It is determined that no physical machine in the target list can accept a second virtual machine, wherein the second virtual machine is in a list of proposed virtual machines; whereby the second virtual machine to be out-migrated is assigned to a non-operational, out-migrating physical machine.

BRIEF DESCRIPTION OF THE DRAWINGS

FIGS. 6A-6B illustrate example migration tables in accordance with the flow charts in FIGS. 5A-5B of the present disclosure;

DETAILED DESCRIPTION

Figure 1:
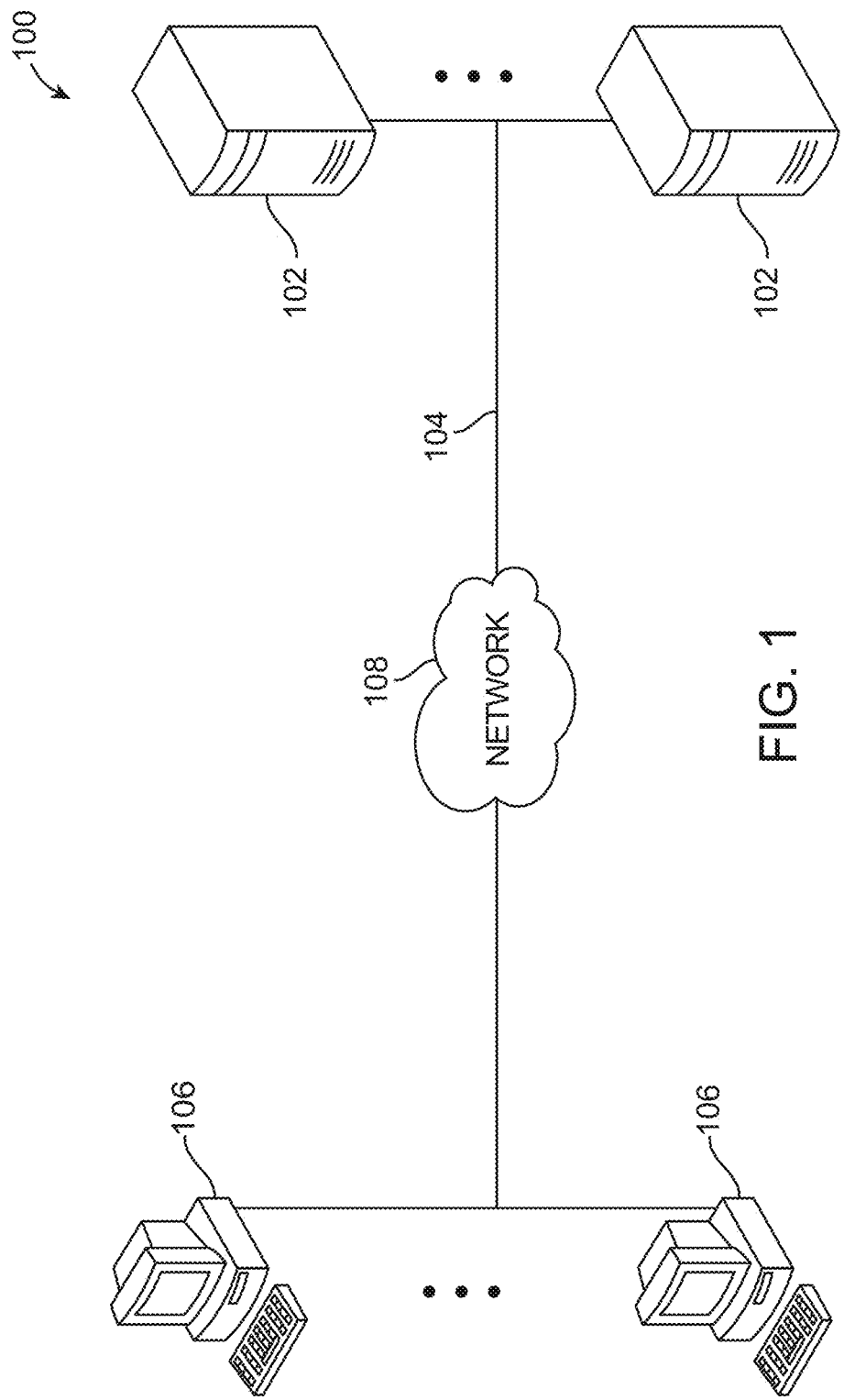
FIG. 1 illustrates a diagram of an example system environment that utilizes a migration process in accordance with an aspect of the present disclosure.

FIG. 1 illustrates a diagram of an example system environment that implements and executes a novel migration process and method of use in accordance with an aspect of the present disclosure. In particular, the example system environment 100 includes a plurality of network devices such as one or more servers 102(1)-102(n) and one or more client devices 106(1)-106(n), although the environment 100 could include other numbers and types of devices in other arrangements. It should be noted that the term "network devices" can be referred to as encompassing one or more client devices, one or more servers, virtual machines and/or other components in the system 100.

The servers 102(1)-102(n) are connected to a local area network (LAN) 104 and the client devices 106(1)-106(n) are connected to a wide area network 108, whereby the one or more client devices 106(1)-106(n) communicate with the one or more servers 102(1)-102(n) via the wide area network 108 and LAN 104. It should be noted that although the client device and/or server may be referred to herein in the plural, it is contemplated that only one client device and/or one server may be considered without being limiting to the language used herein. It should be understood that the particular configuration of the system 100 shown in FIG. 1 are provided for exemplary purposes only and is thus not limiting.

Client devices 106(1)-106(n) comprise computing devices capable of connecting to other computing devices, such as the servers 102(1)-102(n). Such connections are performed over wired and/or wireless networks, such as network 108, to send and receive data, such as for Web-based and non Web-based requests, receiving responses to requests and/or performing other tasks, in accordance with the novel processes described herein. Non-limiting and non-exhausting examples of such client devices 106(1)-106(n) include, but are not limited to, personal computers (e.g., desktops, laptops), mobile and/or smart phones, kiosks, ATMs, tablet devices, PDAs and the like.

In an example, client devices 106(1)-106(n) may be configured to run a Web browser or other software module that provides a user interface for human users to interact with, request resources and/or information, as well as submit instructions over the network 108 to the one or more servers 102(1)-102(n) via Web-based or non Web-based applications. One or more Web-based or non Web-based applications may accordingly run on the servers 102(1)-102(n) that provide the requested data to the client device 106(1)-106(n) and/or perform the requested instructions on behalf of the user. In an example, the client device 106 may be a smart phone, tablet, or smart television in which the client devices 106(1)-106(n) communicate with the servers 102(1)-102(n) via a mobile application (i.e. "mobile app").

Network 108 comprises a publicly accessible network, such as the Internet, which handles communication between the client devices 106(1)-106(n) and the servers 102(1)-102(n). However, it is contemplated that the network 108 may comprise other types of private and public networks. Communications, such as requests from client devices 106(1)-106(n) and responses from servers 102(1)-102(n), preferably take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

LAN 104 may comprise one or more private and public networks which provide secured access to the servers 102(1)-102(n). These types of existing standardized messaging schemes used between financial institutions over WANs and LANs is well known and is not described in detail herein.

The servers 102(1)-102(n) comprise one or more network devices or machines capable of operating one or more Web-based and/or non Web-based applications that may be accessed by other network devices (e.g. client devices, other servers) in the network 108. Such data includes, but is not limited to Web page(s), image(s) of physical objects, user account information, and any other objects and information. It should be noted that the servers 102(1)-102(n) may perform other tasks and provide other types of resources.

As will be discussed in more detail below, one or more servers 102 may comprise a cluster of a plurality of servers which are managed by a network traffic management device (e.g. firewall, load balancer, web accelerator), gateway device, router, hub and the like. In an aspect, one or more servers 102(1)-102(n) may implement a version of Microsoft® IIS servers, RADIUS servers and/or Apache® servers, although other types of servers may be used and other types of applications may be available on the servers 102(1)-102(n).

Figure 2A:
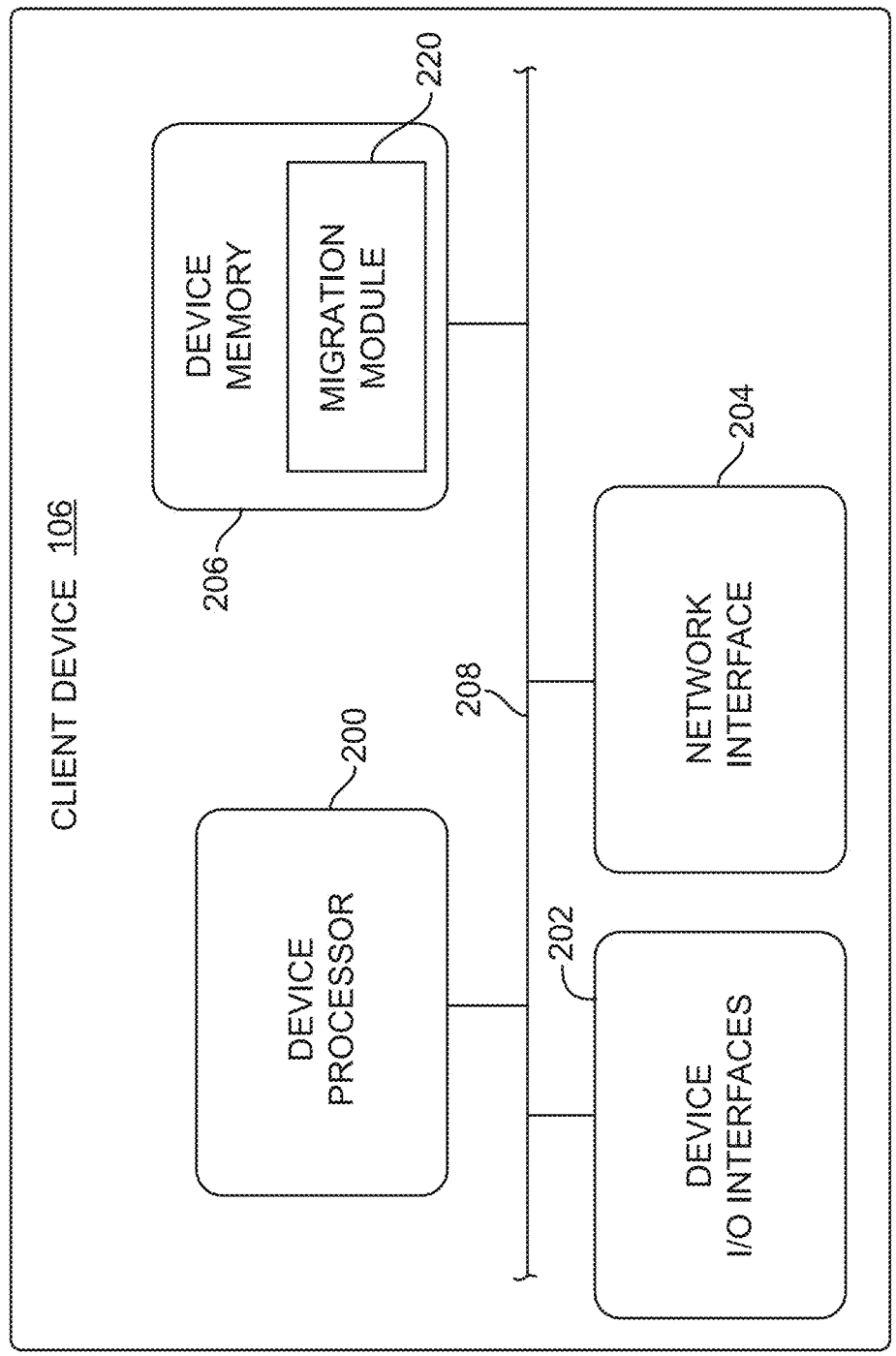
FIG. 2A illustrates a block diagram of a client device implementing at least a portion of a migration module in accordance with an aspect of the present disclosure.

FIG. 2A illustrates a block diagram of a network client device 106 shown in FIG. 1 in accordance with an aspect of the present disclosure. As shown in FIG. 2A, an example client device 106 includes one or more device processors 200, one or more device I/O interfaces 202, one or more network interfaces 204 and one or more device memories 206, all of which are coupled together by one or more buses 208. It should be noted that the device 106 could include other types and numbers of components.

Figure 2B:
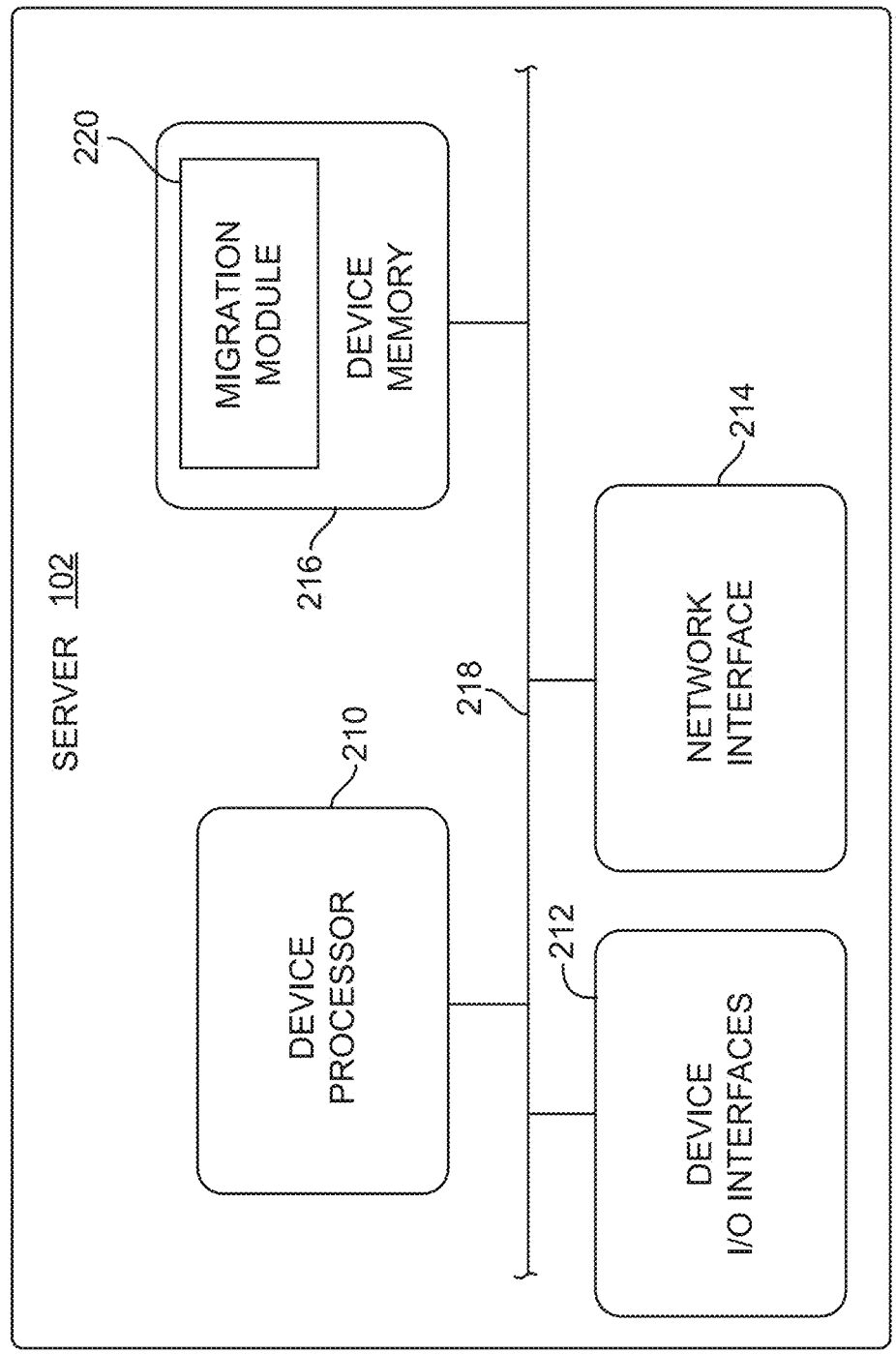
FIG. 2B illustrates a block diagram of a server implementing at least a portion of a migration module in accordance with an aspect of the present disclosure.

FIG. 2B illustrates a block diagram of a network device server 102 shown in FIG. 1 in accordance with an aspect of the present disclosure. With regard to FIG. 2B, an example server 102 is shown which includes one or more device processors 210, one or more device I/O interfaces 212, one or more network interfaces 214 and one or more device memories 216, all of which are coupled together by one or more buses 218. It should be noted that the server 102 could include other types and numbers of components.

Device processor 200, 210 comprises one or more microprocessors configured to execute computer/machine readable and executable instructions stored in the respective local device memory 206, 216 or in a remote device memory (not shown). Such instructions are implemented by the processor 200, 210 to perform one or more functions described below. It is understood that the processor 200, 210 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200, 210 is programmed or configured to execute the process in accordance with the teachings as described and illustrated herein of the novel system and method described below.

Device I/O interfaces 202, 212 comprise one or more user input and output device interface mechanisms. The interface may include a computer keyboard, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding device and the like.

Network interface 204, 214 comprises one or more mechanisms that enable the client devices 106 and/or the servers 102 to engage in TCP/IP or other communications over the LAN 104 and network 108. However, it is contemplated that the network interface 204, 214 may be constructed for use with other communication protocols and types of networks. Network interface 204, 214 is sometimes referred to as a transceiver, transceiving device, or network interface card (NIC), which transmits and receives network data packets over one or more networks, such as LAN 104 and network 108.

In an example where the client device 106 and/or server 102 includes more than one device processor 200, 210 (or a processor 200, 210 has more than one core), each processor 200, 210 (and/or core) may use the same single network interface 204, 214 or a plurality of network interfaces 204, 214 to communicate with other network devices. Further, the network interface 204, 214 may include one or more physical ports, such as Ethernet ports, to couple its respective device with other network devices in the system 100. Moreover, the network interface 204, 214 may include certain physical ports dedicated to receiving and/or transmitting certain types of network data, such as device management related data for configuring the respective device, and the like.

Bus 208, 218 may comprise one or more internal device component communication buses, links, bridges and supporting components, such as bus controllers and/or arbiters. The bus enable the various components of the device 102, 106, such as the processor 200, 210, device I/O interfaces 202, 212, network interface 204, 214, and device memory 206, 216, to communicate with one another. However, it is contemplated that the bus may enable one or more components of its respective device 102, 106 to communicate with components in other devices as well. Example buses include HyperTransport, PCI, PCI Express, InfiniBand, USB, Firewire, Serial ATA (SATA), SCSI, IDE and AGP buses.

However, it is contemplated that other types and numbers of buses may be used, whereby the particular types and arrangement of buses will depend on the particular configuration of the device 102, 106 which houses the bus.

Device memory 206, 216 of the client device 106 or server 102 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200, 210. Such stored instructions allow the processor to perform actions, including implementing an operating system for controlling the general operation of the client device 106 and/or server 102 to perform one or more portions of the novel process described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the network devices 102, 106.

Shown in FIGS. 2A and 2B is a migration module 220 is which comprises software, which when executed by one or more processors, causes the network device 102, 106 to perform the migration process described below and in FIGS. 4-7. It should be noted that although the migration module is shown within memory 206, 216, it may be housed in a separate memory within or exterior to the network device 102, 106.

Table 1 describes notations used by the migration module for 'time-window' based migration. There is a set of physical machines "PM (I)", a set of virtual machines "VM (J)" and the mappings ($J_i$) from the virtual machines to the physical machines. Every physical machine hosts multiple virtual machines. Given a 'time window' (w), certain virtual machines demand or will likely to demand more resources, such as CPU and memory of the physical machine which is running on, than are currently allocated to it by the scheduler.

TABLE 1

Table of Notations and Sets i: Notation for physical machines
j: Notation for virtual machines
w: Length of the time - window.
I: Set of all physical machines.
J: Set of all virtual machines.
$I^A$: Set of physical machines affected during w, $I^A \subset I$.
$I^B$: Set of physical machines not affected during w, $I^B \subset$.
$J_i$: Set of virtual machines in physical machine i.
$J_i^A$: Set of virtual machines in physical machine i identified for migration, $I \in I^A$
$K_i$: First K members (VMs) of the set (PM) i, $i \in I^A$ sorted in certain sequence, $K \leq |J_i|$ Within the present disclosure, the term "In-migration" is defined as the migration of a Virtual Machine j, where j is an element of $J_i$ and i is an element of $I^A$ to another Physical Machine i', where i' is an element of $I^A$. It should be noted that In-migration occurs when there is a Virtual Machine j', j' is an element of $J_{i'}$ and i' is an element of $I^A$ that migrates to some other Physical Machine, where i is an element of I.

Within the present disclosure, the term "Out-migration" is defined as the migration of a Virtual Machine j, where j is an element of $J_i$ and I is an element of $I^A$, to a Physical Machine i', where i' is an element of $I^B$.

Maximizing the number of in-migrations is done to ensure that the physical machines that are already powered are to be utilized for accommodating the migrating virtual machines. This in turn ensures effective utilization of physical machines that are already powered and minimizes the need to switch on additional physical machines that are currently powered down, as migrating to non-operating machines is expensive and time consuming.

Table 2 gives a complete list of the parameters and the variables that are used.

TABLE 2

Table of Parameters and Variables

Parameters $C_{ii'j}$: Cost of relocating a VM j from one PM, i, to another PM, i'.
$cpu_j$: CPU usage of VM j.
$mem_j$: Memory usage of VM j.
$CPU_i$: CPU capacity of server i.
$MEM_i$: Memory capacity of server i.

Variables $$X_{ii'j} = \begin{cases} 1 & \text{if VM } j \in J_i \text{ is moved from } i \in I^A \text{ to } i' \in I \text{ but } i' \neq i \\ 0 & o/w \end{cases}$$

The migration module 220 of the network device utilizes several algorithms to analyze and identify the capacity constraints of each of the operating physical machines. In particular, the migration module 220 minimizes $$\sum_{i \in I^A} \sum_{i \in J_i} \sum_{i' \in I, i' \neq i} C_{ii'j} X_{ii'j},$$

based on the following equations:

$$\sum_{j \in J_i} cpu_j + \sum_{i' \in I^A} \sum_{i \in J_{i'}} X_{i'ij} cpu_j \leq CPU_i \ \forall \ i \in I^B \quad (1)$$

$$\sum_{j \in J_i} \left(1 - \sum_{i'' \in I/\{i\}} X_{i,i'',j}\right) cpu_j + \sum_{i' \in I^A} \sum_{i \in J_{i'}} X_{i'ij} cpu_j \leq CPU_i \ \forall \ i \in I^A \quad (2)$$

$$\sum_{j \in J_i} mem_j + \sum_{i' \in I^A/\{i\}} \sum_{j \in J_{i'}} X_{i'ij} mem_j \leq MEM_i \ \forall \ i \in I^B \quad (3)$$

$$\sum_{j \in J_i} \left(1 - \sum_{i'' \in I/\{i\}} X_{i,i'',j}\right) mem_j + \sum_{i' \in I^A} \sum_{i \in J_{i'}} X_{i'ij} mem_j \leq MEM_i \ \forall \ i \in I^A \quad (4)$$

$$\sum_{i'} X_{i,i',j} \leq 1 \ \forall \ i \in I^A, j \quad (5)$$

Of the above, Equations (1) and (3) ensure that the capacity constraints on the under-utilized physical machines ($I^B$) are not violated due to out-migrations. Additionally, Equations (2) and (4) ensure that the capacity constraints on the over-burdened physical machines ($I^A$) are not violated as a result of in-migrations. Equation (5) ensures that a virtual machine can migrate to only one physical machine.

The migration module 220 is configured to give priority to in-migration of virtual machines to an operating physical machine rather than out-migration to a non-operating machine. In particular, the migration module 220 determines that the cost C of moving a virtual machine to a physical machine affected by the time window (in-migration) is less than moving the virtual machine to another physical machine which is not affected by the time window (out-migration).

In addition, the migration module 220 considers the time it takes to migrate a virtual machine to a particular physical machine and compares it with other virtual machines that are candidates to migrate to that particular machine. In particular, the migration module 220 takes into account a longer migration time to an increased cost C.

In addition, the migration module 220 takes into account that the total migration time for the live migration of virtual machines depends not only on the total memory occupied by each virtual machine but also on the writable working set of each virtual machine. It is possible to represent the total migration time by equation (6)

$$\text{total migration time} = k \text{ Total Memory} + (1-k) \text{ Writable Working Set} \quad (6)$$

$0 < k < 1$, where k is a tunable parameter.

However, for a data center involving hundreds of physical machines and hundreds of thousands of virtual machines, the migration module 220 uses heuristic procedures to approximate the solution within a reasonable amount of computation time.

As stated above, the migration module 220 determines which of the virtual machines belonging to the physical machine should be migrated based on cost parameters. The migration module 220 thereby rearranges the virtual machines on the overloaded physical machines in a manner that the number of virtual machine in-migrations to other candidate physical machines is minimal. The migration module 220 then consolidates and out-migrates the remaining virtual machines to the operating physical machines.

Figure 3:
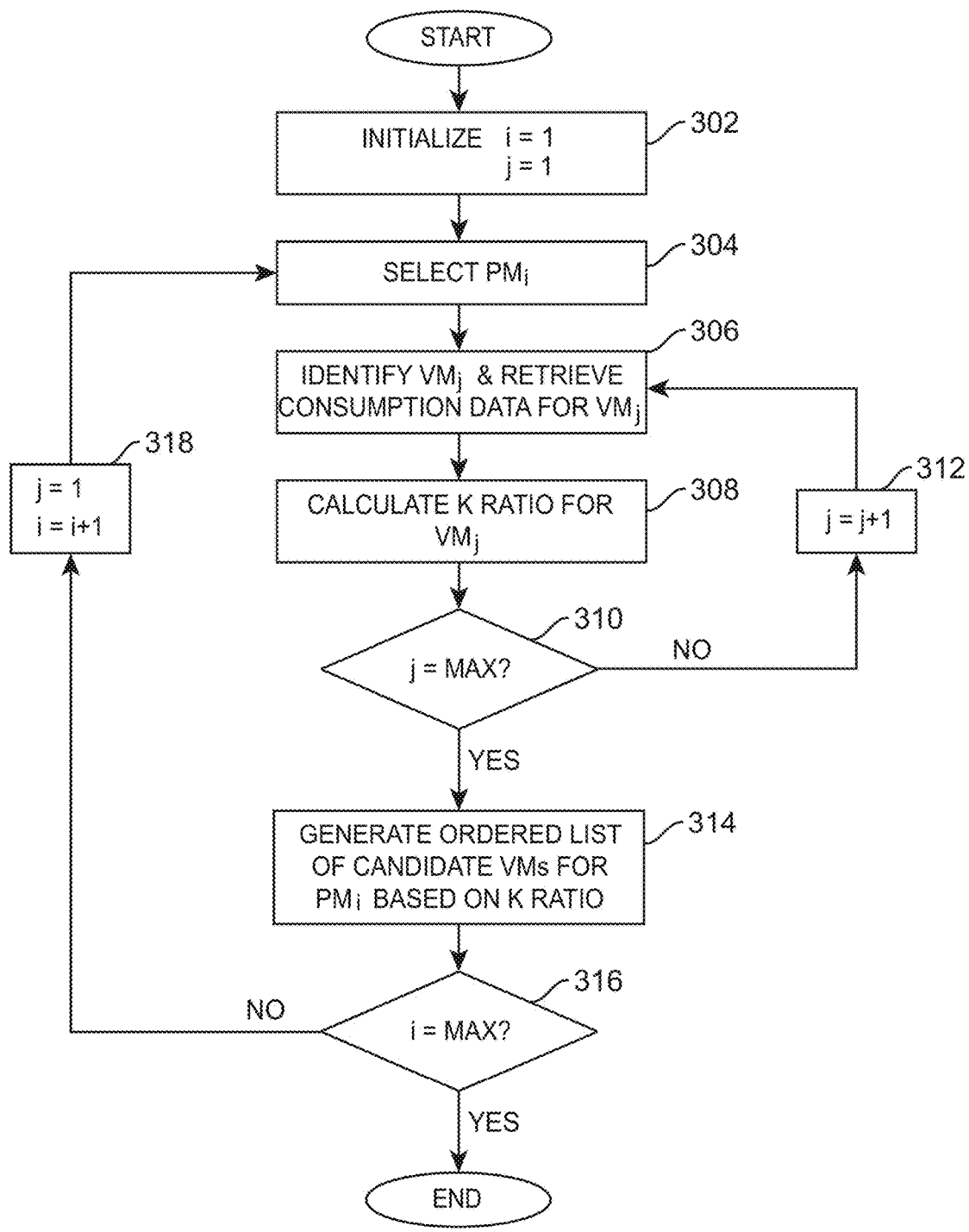
FIG. 3 illustrates a flow chart which illustrates a virtual machine identification process in accordance with an aspect of the present disclosure.

FIG. 3 is a flow chart which illustrates a virtual machine identification process in accordance with an aspect of the present disclosure. The process in FIG. 3 seeks to identify for each of the over-loaded Physical Machines, or PMs, ($I^A$), the candidate virtual machines, or VMs, ($J_i$), that need to be migrated. The process begins at the Start Block where the value for i=1 and the value j=1 (Block 302). Thereafter, the migration module 220 selects $PM_i$ in Block 304. The migration module 220 also identifies $VM_j$ along with its consumption data for the CPU and Memory resource dimensions (Block 306).

The migration module 220 thereafter calculates the K ratio for the selected $VM_i$ (Block 308). In particular, the K or cost ratio represents the amount of capacity that the VM uses over a product of the physical machine's CPU and Memory resource dimensions. This is represented in Equation (7):

$$C_j/(cpu_j \times mem_j) \quad (7)$$

As shown in FIG. 3, if the value of j is not at the max value, or is not the last VM that is being considered for the $PM_i$ (Block 310), the j value is incremented by 1, as in Block 312, and the process returns to Block 306.

However, if the value of j is at the max value, or is the last VM that is being considered for the $PM_i$ (Block 310), the migration module 220 generates an candidate list of all the VMs for the $PM_i$ in which the VMs are listed in ascending order of their respective K ratio values (Block 314). In an example, if $J_i^A$ is denoted as a set of virtual machines that are chosen to be migrated. The members of this set that are in the top $K_i$, who's aggregate resource usage of the remaining $(|J_i|-K_i)$ do not violate the capacity constraints of PMi in any of the dimensions.

As shown in FIG. 3, if the value of i is not at the max value, or is not the last PM that is being considered (Block 316), the j value is initialized back to a value of 1 and the i value is incremented by 1, as in Block 318, and the process returns to Block 304. Otherwise, the process ends at the End Block.

Once all of the virtual machines of the selected physical machines are analyzed and ordered in the candidate lists, the migration module 220 seeks to re-calculate the VM allocations such that the number of in-migrations is maximized. By maximizing the number of in-migrations, the migration module attempts to make use of the existing powered-on physical machines for accommodating the migrating VMs.

Figure 4:
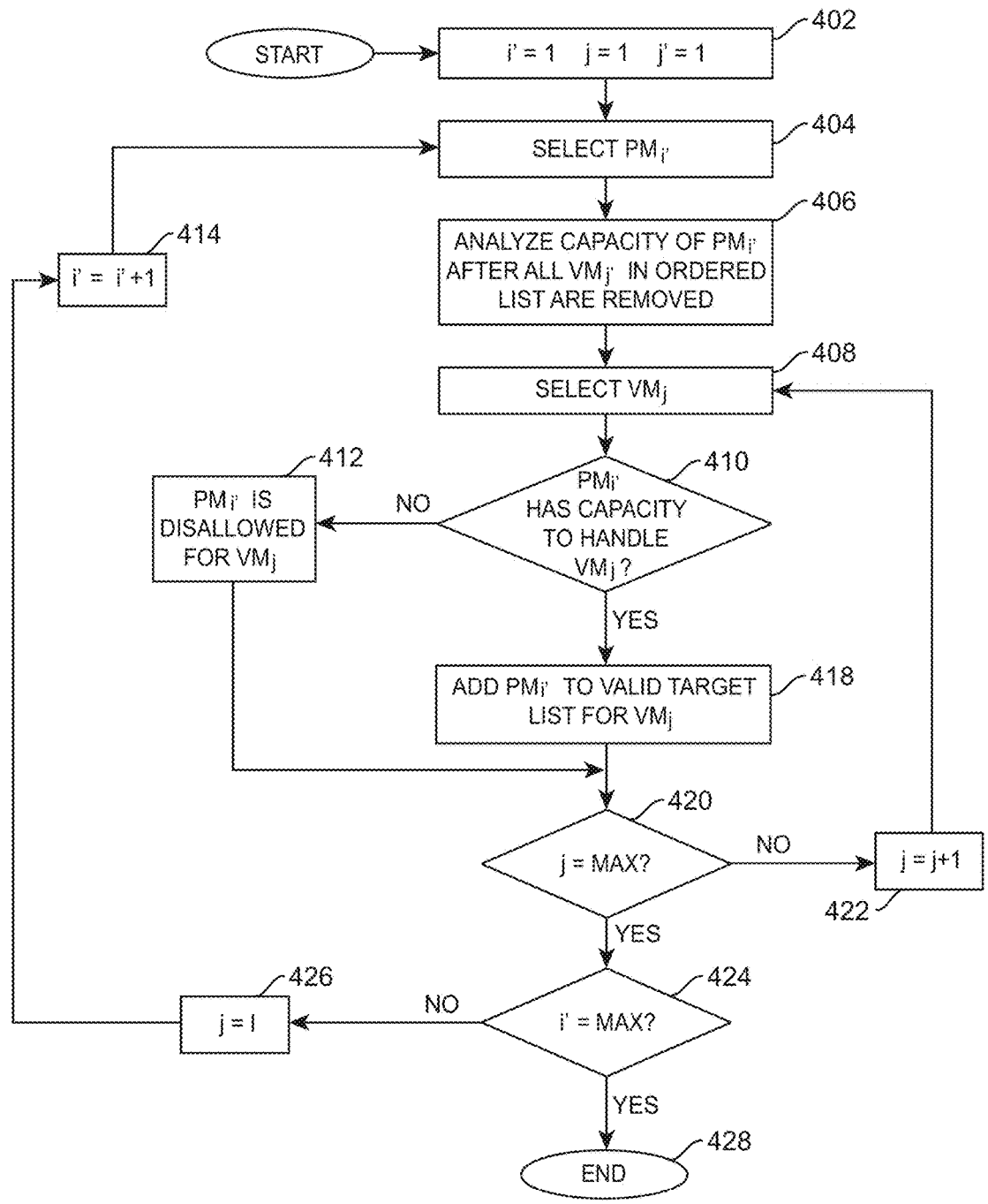
FIG. 4 illustrates a flow chart which illustrates a process of identifying physical machines to accept the migrating virtual machines in accordance with an aspect of the present disclosure.

FIG. 4 is a flow chart which illustrates a process of identifying candidate physical machines that are capable of hosting the migration of virtual machines in accordance with an aspect of the present disclosure. As shown in FIG. 4, the process begins at the Start Block where the value for i'=1 and the value j=1 (Block 402). For clarity, i' represents a physical machine other than the physical machine on which the virtual machine j currently resides.

As shown in FIG. 4, PM i' is selected in Block 404 whereby the migration module 220 analyzes the capacity of PM i' by removing all the virtual machines in the ordered list corresponding to PM i' calculated earlier in Block 314 to determine what PMi's capacity would be (Block 406). It should be noted that the migration module 220 does not actually remove the virtual machines, but only analyzes the increase in PM i's resource capacity if the virtual machines were to be removed.

In Block 408, the migration module 220 selects a VM j and determines whether PM i' would have the capacity to handle VM j if it were to be migrated to PM i' (Block 410). If not, the migration module 220 considers PM i' to be disallowed (Block 412). Thereafter, the process proceeds to Block 420, which is discussed in more detail below.

Returning to Block 410, if PM i' has the capacity to handle VM j if it were to be migrated to PM i', the migration module 220 adds PM i' to the valid target list for the virtual machine VM j (Block 418). Thereafter, the migration module 220 determines if the value of j is at the maximum value and is the last VM that is being considered (Block 420). If not, the j value is incremented by 1, in Block 422, and the process returns to Block 408.

However, if the migration module 220 determines that the value of j' is at the max value (Block 424), the j value is initialized back to a value of 1 (Block 426), and the i' value is incremented by 1 in Block 414, and the process returns to Block 404. If the migration module 220 determines that the value of i' is at its max value, the process ends at Block 428.

Figure 5A:
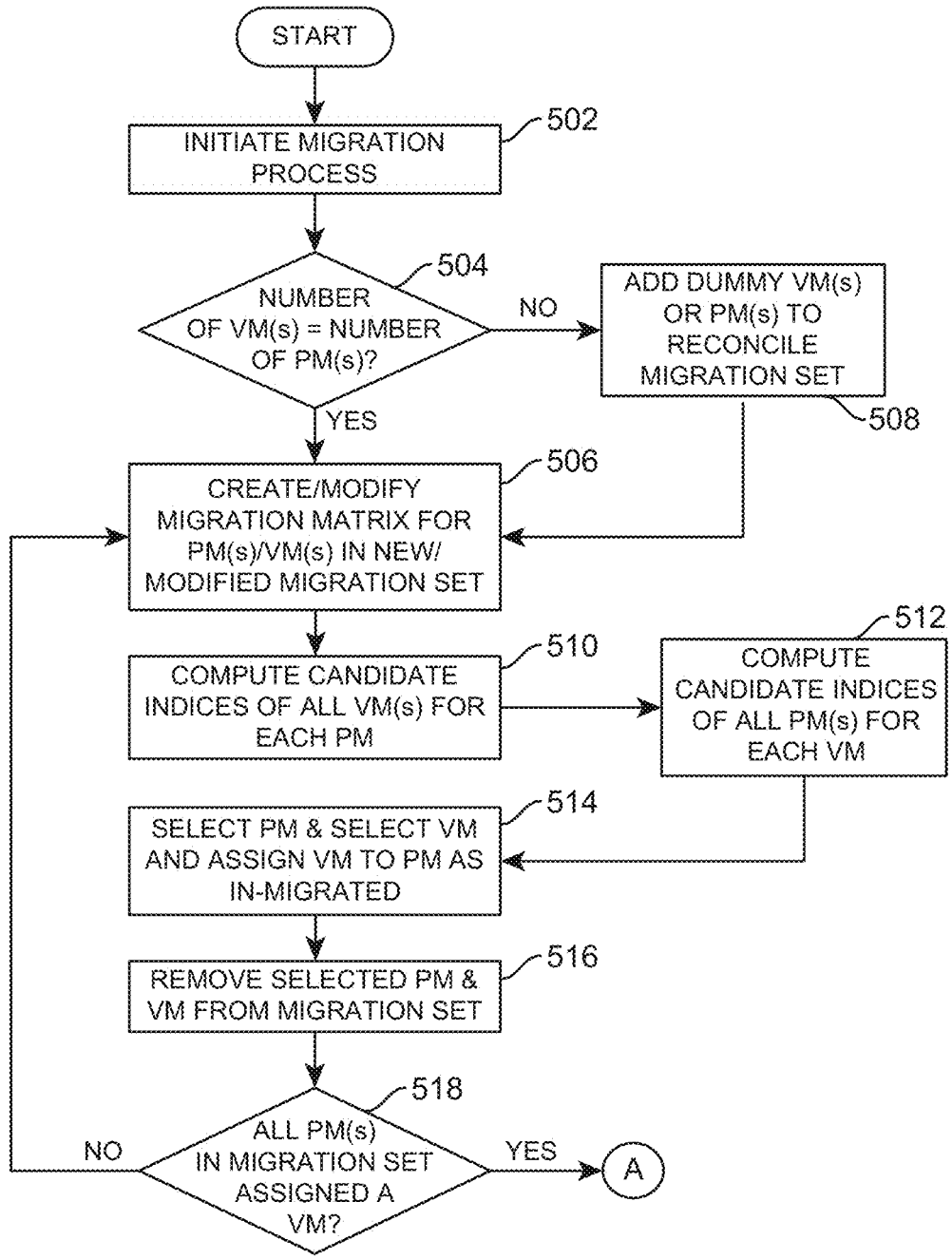
FIGS. 5A-5B illustrate flow charts which illustrate a process of selectively assigning and virtual machines to physical machines in accordance with an aspect of the present disclosure.
Figure 5B:
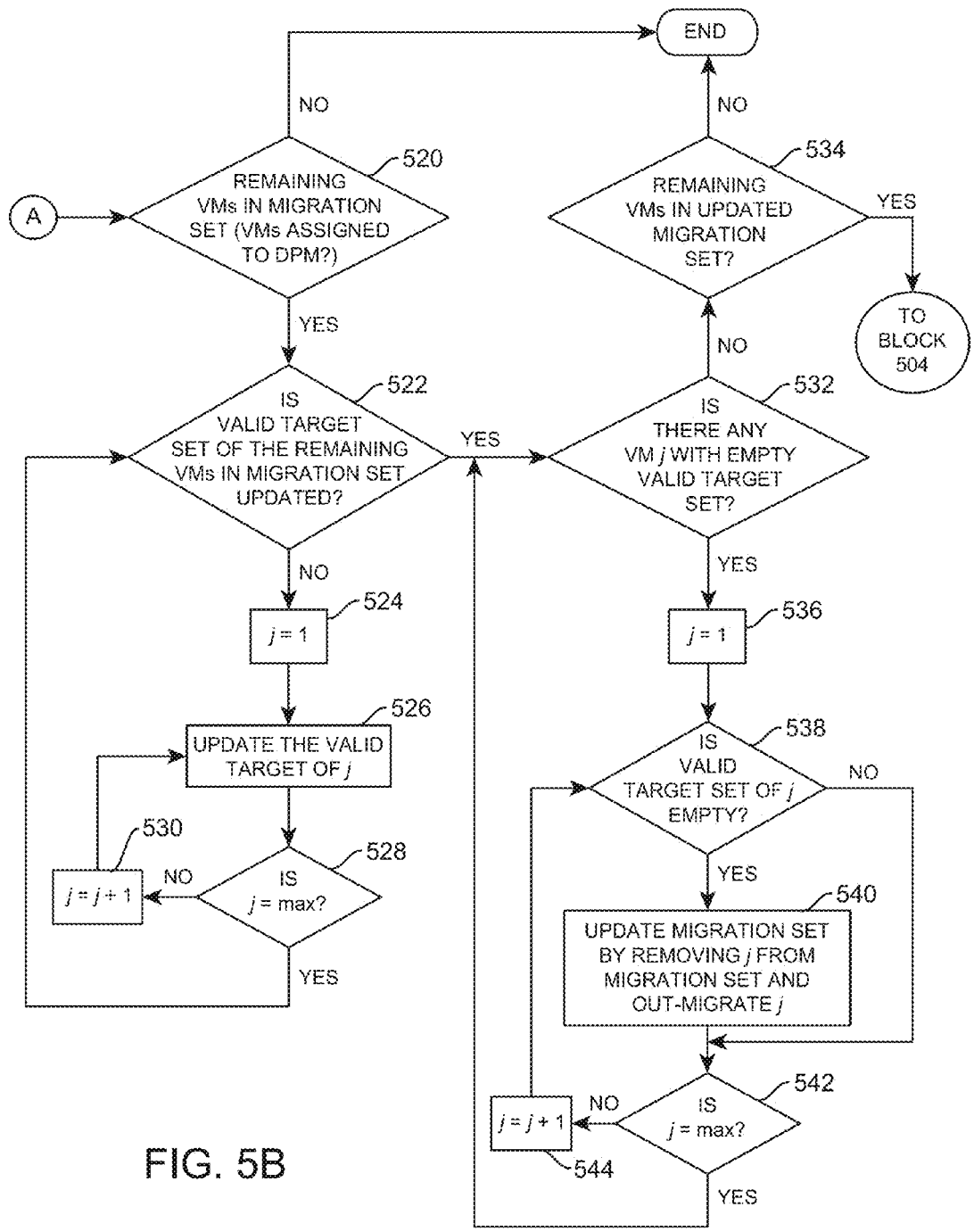
Figure 6B:
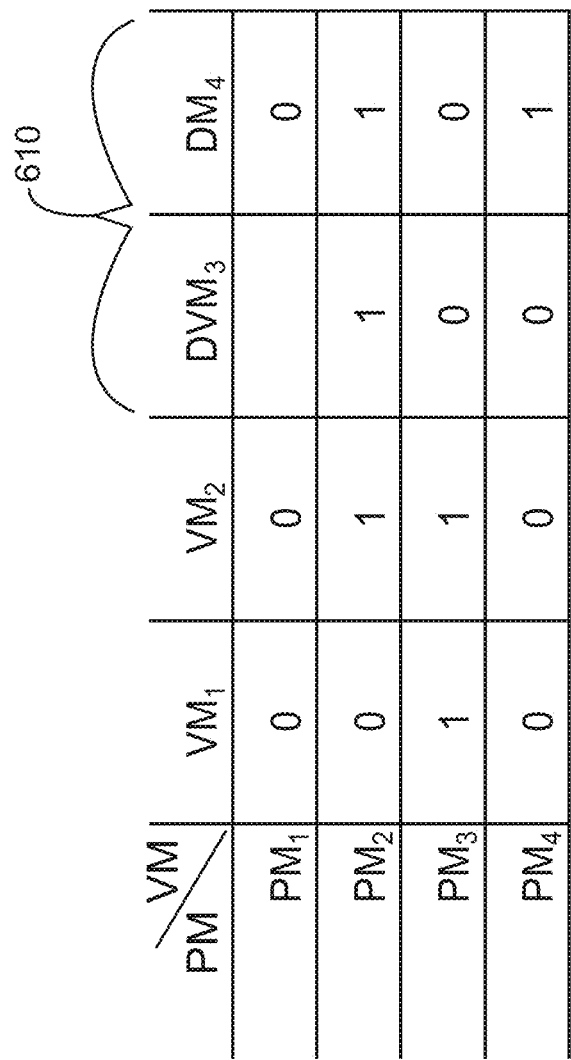

FIGS. 5A-5B are flow charts which illustrate a process of selectively assigning and migrating virtual machines to physical machines in accordance with an aspect of the present disclosure. FIGS. 6A-6B illustrate example migration matrices 600 which will be referred to in describing the process in FIGS. 5A-5B.

In performing the process in FIGS. 5A-5B, the migration module searches for a feasible assignment of the $$\sum_{i \in I^A} K_i \left( = \sum_{i \in I^A} |J_i^A| \right)$$

VMs on the $|I^A|$ PMs. The process shown in FIGS. 5A-5B preferably terminates after one or more iterations and returns a maximal subset of VMs which can be in-migrated to available PMs. The process shown in FIGS. 5A-5B preferably terminates after one or more iterations and returns a maximal subset of VMs which can be in-migrated to available PMs.

As shown in FIGS. 5A-5B, the process begins at the Start Block and proceeds where the migration module 220 initiates a migration process between a set of a plurality of virtual machines VM(s) and a set of a plurality physical machines PM(s) (Block 502). In particular, the PMs used in the migration process are considered by the migration module 220 to be in the migration set if the virtual machines VM can be in-migrated thereto. Additionally, the VMs used in the migration set are those identified by the migration module 220 to be assigned to an in-migrating and/or out-migrating PM.

As shown in FIGS. 5A-5B, the migration module 220 then determines whether the number of VMs is equal to the number of PMs in each set (Block 504). If not, the migration module 220 reconciles the matrix by adding one or more dummy machines to the lesser number of machines until an equivalent number of virtual and physical machines are to be considered (Block 508). For instance, if the migration module 220 determines that there are more VMs than PMs in a migration matrix, the migration module 220 adds one or more Dummy Physical Machines (DPM) until the total number of PMs is equal to the total number of VMs (as shown in FIG. 6A). In contrast, if the migration module 220 determines that there are more PMs than VMs in a migration matrix, the migration module 220 adds one or more Dummy Virtual Machines (DVM) until the total number of PMs is equal to the total number of VMs (as shown in FIG. 6B).

The process proceeds where the migration module 220 generates a migration matrix comprising the set of PMs and the set of VMs, whereby the migration matrix is used by the migration module 220 to perform the pairing analysis. It should be noted that although a migration matrix 600 is referred herein to describe the in-migration/out-migration process, other methods of performing the pairing analysis are contemplated (e.g. cross-referenced tables, etc.).

As shown in FIG. 6, the matrix 600 includes the set of VMs ($VM_1$, $VM_2$, $VM_3$, etc.) arranged horizontally 602 along with the set of PMs ($PM_1$, $PM_2$, $PM_3$, etc.) arranged vertically 604. In addition, the matrix 600 includes a plurality of cells 606, whereby each cell references whether a particular PM and VM can potentially be paired. As shown in FIG. 6, each cell is shown to contain either a value of "0" or "1". The values in the cells 606 are determined from the process described in FIG. 4, wherein a value of "1" is placed in a cell for a particular VM it is determined by the migration module 220 that the PM can be added to the valid target list for that VM (see Block 418). In contrast, a value of "0" is placed in a cell for a particular VM it is determined by the migration module 220 that the PM can be disallowed for that VM (see Block 418).

Referring back to FIGS. 5A-5B, after the migration matrix 600 is generated, the migration module 220 computes a candidate metric for each PM (Block 510). As shown in FIG. 6A, column 610 shows candidate indices for each PM, whereby the value of the candidate metric represents the number of VMs that a particular PM can be paired with. For instance, $PM_1$ has a candidate metric of "2", which signifies that $PM_1$ can be potentially paired with 2 VMs, whereas $PM_2$ has a candidate metric of "5", which signifies that $PM_2$ can be potentially paired with 5 VMs. These candidate indices are used by the migration module 220 to rank the PMs to consider in order of their increasing candidate metric values 610.

Referring back to FIGS. 5A-5B, the migration module 220 also computes a candidate metric for each VM (Block 512). As shown in FIG. 6A, row 612 shows candidate indices for each VM, whereby the value of the candidate metric represents the number of PMs that a particular VM can be paired with. For instance, $VM_1$ has a candidate metric of "1", which signifies that $VM_1$ can be potentially paired with 1 VM, whereas $PM_2$ has a candidate metric of "2", which signifies that $VM_2$ can be potentially paired with 2 PMs. These candidate indices are used by the migration module 220 to rank the VMs to consider in order of their decreasing candidate metric values 612.

Referring back to FIGS. 5A-5B, the migration module 220 thereafter selects one PM based on its candidate metric value 610 and selects one VM based on its corresponding candidate metric value 612 and assigns the VM to that particular PM for pairing (Block 516). In an aspect, during the first iteration of the assigning step in Block 516, the migration module 220 chooses a PM with the smallest candidate metric value 610. A PM having a relatively smaller metric value means that the PM is more constrained and thus less flexible (as opposed to a PM having a larger metric value) in being paired with the available VM in the migration set. For example in the exemplary matrix 600 in FIG. 6A, $PM_4$, which has a candidate metric value of "1" can only be paired with $VM_4$ and is thus more constrained than $PM_3$, which can accept 3 virtual machines (e.g. $VM_2$, $VM_5$, and $VM_6$).

Additionally, the migration module 220 chooses a VM with the smallest candidate metric value 612 which has the selected PM in its target list (i.e. has a "1" value for the PM in cell 606). A VM having a relatively smaller metric value means that the VM is more constrained and thus less flexible (as opposed to a VM having a larger metric value) in being paired with the available PM in the migration set. For example in the exemplary matrix 600 in FIG. 6A, $VM_1$, which has a candidate metric value of "1" can only be paired with $PM_3$ and is thus more constrained than $VM_3$, which can be accepted by 2 virtual machines (e.g. $PM_2$ and $PM_3$). In an aspect, the migration module 220 analyzes the spare capacity data of the selected PM as well its forecasted usage of the selected VM's consumption parameters. In an example aspect, the spare capacity of each under-loaded PM is considered to be the bin capacity and forecasted usage of the VM is taken as the item size for computing the vector packing problem.

Referring back to FIGS. 5A-5B, once the selected VM is assigned to the selected PM, both of these machines are temporarily removed from the matrix 600 by the migration module 220 for creation of a modified migration matrix (Block 516). This step allows the migration module 220 to consider the remaining physical and virtual machines in the migration set and easily assign them by removing the most constrained or flexible machines from consideration. Alternatively, the least constrained or inflexible machines can be removed from consideration. It should be noted that, in an embodiment, only one VM and PM are considered, assigned and removed per iteration, although it is contemplated that more than one VM and PM can be considered, assigned and removed in a single iteration.

As shown in FIGS. 5A-5B, the migration module 220 thereafter determines whether all of the PMs in the migration set have been assigned a corresponding VM in the matrix (Block 518). If not, the process returns to Block 506 where the migration module 220 considers the modified migration matrix 600 in which the already assigned PM(s) and VM(s) are removed from the modified matrix 600. This process will continue until each of the PMs (including DPM(s)) in the migration matrix has been assigned a VM.

In contrast, if the migration module 220 determines that all of the VMs in the migration set have been assigned a PM in the matrix, the migration module 220 thereafter determines whether there are one or more remaining VMs in the migration set (Block 520). In case there are VMs that have been assigned to DPMs then this indicates that there are one or more remaining VMs in the migration set. If there are no remaining VMs in the migration set that are to be considered, the migration module 220 concludes that all of the VMs have been assigned to the non-dummy PMs in the migration set (or have been out-migrated, as discussed below) and the process ends (End Block).

In contrast, if the migration module 220 determines that there are one or more VM(s) remaining in the migration matrix which have not been assigned to a non-dummy PM (which means that these VMs are currently assigned to a DPM) (Block 520), the migration module 220 determines whether the valid target set of the VM(s) is updated (Block 522). If the valid target set of the VM(s) is not updated, the value j is set to a value of one (Block 524) and the valid target set of j is updated (Block 526). Thereafter, the migration module 220 determines if the value of j has reached the maximum value (Block 528). If so, the process returns to Block 522. In contrast, if value of j has not reached the maximum value, j is incremented by one (Block 530) and the process repeats back to Block 526.

Returning to Block 522, if the migration module 220 determines that the valid target set(s) of the remaining VM(s) are updated, the migration module 220 determines whether there are any $VM_j$ with an empty valid target set (Block 532). If not, the migration module 220 determines whether there are any remaining VM(s) in the updated migration set (Block 534). If so, the process returns back to Block 504 or otherwise the process ends at the End Block.

Returning to Block 532 if the migration module 220 determines that there are one or more $VM_j$ that have an empty valid target set, the migration module sets the value j to one (Block 536). The migration module 220 thereafter determines if the valid target set of j is empty (Block 538). If not, the process continues to Block 542. In contrast, if valid target set of j is empty, the migration module 220 updates the migration set by removing j from the migration set and out-migrating j (Block 540). The process then proceeds to Block 542.

With respect to Block 542, the migration module 220 determines if the value of j is at a maximum value. If so, the process returns back to Block 532. Otherwise, j is incremented by one (Block 544) and the process repeats back to Block 538.

Thus, remaining VMs that are un-assigned during the re-arrangement process (i.e. the VMs with an empty valid target list) need to be out-migrated to the under-loaded PMs using a vector packing problem. In an aspect, the migration module 220 analyzes the spare capacity of each under-loaded PM as well its forecasted usage of the VM. In an example aspect, the spare capacity of each under-loaded PM is considered to be the bin capacity and forecasted usage of the VM is taken as the item size for computing the vector packing problem. The complexity of stagẽ1 is $|I^A|O(|J_1|\ln(|J_i|))$ where $i \in I^A$ and that of stagẽ2 is exponential. In the example aspect, $$O\left(\sqrt{\log\left|\sum_{i \in I^A} K_i\right|}\right)$$

algorithm can be computed by the migration module 220 to determine and perform out-migration of VMs to dummy PMs by an effective means. In another example aspect, $$O(|J_i|\ln(|J_i|)) + O\left(\sqrt{\log\left|\sum_{i \in I^A} K_1\right|}\right)$$

can be computed by the migration module 220 to determine out-migration of the VMs to the dummy PMs in an effective means.

An experiment was conducted by the inventors utilizing the above processes and algorithms. Details of the experiment are reproduced to show enablement of the present novel method and system as well as its clear advantages. It should be noted that the below experiment, utilized hardware and software, as well as the results are exemplary and are not to be construed as being limiting to the present disclosure.

Within the experiment, the algorithms described above were implemented in Java on a computer network device having a Pentium D 2.8 GHz processor, and 1 GB DDR2 533 MHz RAM. Tests were conducted by varying the number of over-loaded PMs. For experimental purposes, it was assumed that each of the over-loaded PMs hosted three VMs each. The initial load (CPU and memory utilization) on a PM was simulated from a uniform distribution in a manner that the PM was under-loaded. Without loss of generality it was assumed in the test cases that only one of the hosted VM on each of the PMs was the cause of the over-load situation in the PM. For constructing the test cases, a VM on each of the PMs was selected randomly using a uniform distribution. It was then decided to overload either the CPU or the memory of the chosen VM using a uniform distribution. Results are compared with the currently practiced "Event Based First Fit" approach where the VM migration was triggered as soon as the event (over-load situation on a PM) was detected and the VM responsible for the over-load, was migrated to the first PM that could accommodate it.

TABLE 3

(CPU, Memory) utilization combination for an instance of 8 over-loaded PMs:

|  | $PM_1$ | $PM_2$ | $PM_3$ | $PM_4$ | $PM_5$ | $PM_6$ | $PM_7$ | $PM_8$ |
|---|---|---|---|---|---|---|---|---|
| $VM_1$ | (10, 55) | (50, 50) | (10, 10) | (50, 50) | (10, 10) | (50, 50) | (10, 10) | (50, 50) |
| $VM_2$ | (20, 20) | (40, 40) | (20, 65) | (40, 40) | (20, 20) | (40, 45) | (20, 65) | (45, 40) |
| $VM_3$ | (30, 30) | (15, 10) | (30, 30) | (15, 10) | (75, 301) | (10, 10) | (30, 30) | (10, 10) |

TABLE 4

Migration cost ($C_{ii'j}$) of VMs from their current hosts to new hosts. Note that $C_{ii'j} = 0 \forall i = i'$

|  | Cost of Migrating to PM, $i \in I^A$ | Cost of Migrating to PM, $i \in I^N$ |
|---|---|---|
| $VM_1$ on $PM_1$ | 55 | 115 |
| $VM_2$ on $PM_1$ | 20 | 80 |
| $VM_3$ on $PM_1$ | 30 | 90 |
| $VM_1$ on $PM_2$ | 50 | 110 |
| $VM_2$ on $PM_2$ | 40 | 100 |
| $VM_3$ on $PM_2$ | 10 | 70 |
| $VM_1$ on $PM_3$ | 10 | 70 |
| $VM_2$ on $PM_3$ | 65 | 125 |
| $VM_3$ on $PM_3$ | 30 | 90 |
| $VM_1$ on $PM_4$ | 50 | 110 |
| $VM_2$ on $PM_4$ | 40 | 100 |
| $VM_3$ on $PM_4$ | 10 | 70 |
| $VM_1$ on $PM_5$ | 10 | 70 |
| $VM_2$ on $PM_5$ | 20 | 80 |
| $VM_3$ on $PM_5$ | 30 | 90 |
| $VM_1$ on $PM_6$ | 50 | 110 |
| $VM_2$ on $PM_6$ | 45 | 105 |
| $VM_3$ on $PM_6$ | 10 | 70 |
| $VM_1$ on $PM_7$ | 10 | 70 |
| $VM_2$ on $PM_7$ | 65 | 125 |
| $VM_3$ on $PM_7$ | 30 | 90 |
| $VM_1$ on $PM_8$ | 50 | 110 |
| $VM_2$ on $PM_8$ | 40 | 100 |
| $VM_3$ on $PM_8$ | 10 | 70 |

Table 3 shows one sample test case for 8 overloaded PMs and each PM hosting three VMs. The need for contrived tables within the limitation of the page-width required that no more than of 3 VMs were on each of the overloaded PMs. This, however this is not a limitation of the current work as the number of VMs on the overloaded PMs can be any.

As can be observed from the table that $PM_1$, $PM_3$, $PM_6$, $PM_7$ are overloaded on the memory dimension while the remaining PMs are overloaded on the CPU dimension. In addition, to the 8 overloaded PMs, the test case also has 8 under-loaded PMs (thus, a total of 16 PMs). The, capacity of all the 16 PMs in both the dimensions (CPU and memory) was considered to be 100. The test case assumed that the under-loaded PMs have only one VM each consuming 10% of the CPU and memory. Thus, there were a total of 32 VMs distributed across 16 PMs.

Table 4 shows the migrating cost of a VM from its current over-loaded host, i, ($C_{ii'j}$) to some other PM i'. Column 2 of the table shows the cost of migration when the VM relocates to a PM, $i \in I^A$ and column 3 of the table shows the cost of migration when the VM relocates to a PM, $i \in I^B$. The above test case was modeled in GAMS and run using the XPRESS solver on a NEOS server. The model had 384 discrete variables. The solver returned an optimal value of 170 within 2.43 seconds.

The solution involved migrating $VM_2$ on $PM_1$ to $PM_5$, $VM_3$ on $PM_2$ to $PM_5$, $VM_1$ on $PM_3$ to $PM_4$, $VM_3$ on $PM_4$ to $PM_5$, $VM_3$ on $PM_5$ to $PM_{10}$, $VM_1$ on $PM_7$ to $PM_5$, $VM_3$ on $PM_8$ to $PM_1$. Thus, a total of 7 in-migrations and 1 out-migration took place in the experiment. Thus, even though, $VM_1$ on $PM_1$ was the cause of the memory overload, the novel system and method suggested re-location of $VM_2$ out from $PM_1$. A myopic event based approach would have resulted in relocation of $VM_1$ out of $PM_1$. The event based first fit migration results in a total of 4 in-migrations and 4 out-migrations with a total cost of 655. The in-migrations involved moving $VM_1$ on $PM_2$ to $PM_1$, $VM_1$ on $PM_4$ to $PM_3$, $VM_1$ on $PM_6$ to $PM_5$, $VM_1$ on $PM_8$ to $PM_7$. The above described algorithms also produced results in a total of 4 in-migrations and 4 out-migrations but with a total migration cost of 560. The algorithm took approximately 7 ms to generate this solution. The in-migrations in this case involved moving $VM_3$ on $PM_1$ to $PM_2$, $VM_3$ on $PM_3$ to $PM_4$, $VM_3$ on $PM_7$ to $PM_6$ and $VM_1$ on $PM_2$ to $PM_5$. The out-migrations involved moving $VM_1$ out of $PM_4$, $VM_3$ out of $PM_5$, $VM_1$ out of $PM_6$, $VM_1$ out of $PM_8$.

Figure 7A:
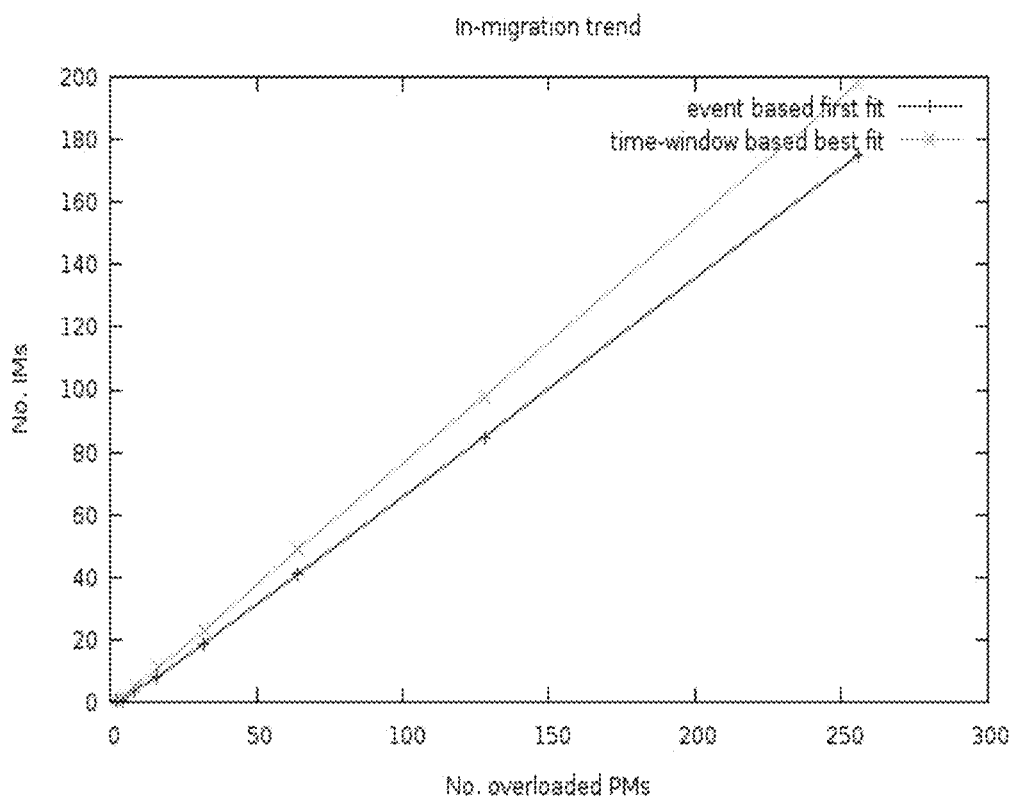
FIG. 7A is a graph to an example illustrating in-migration trend for an example event based first fit algorithm versus a heuristic algorithm.
Figure 7B:
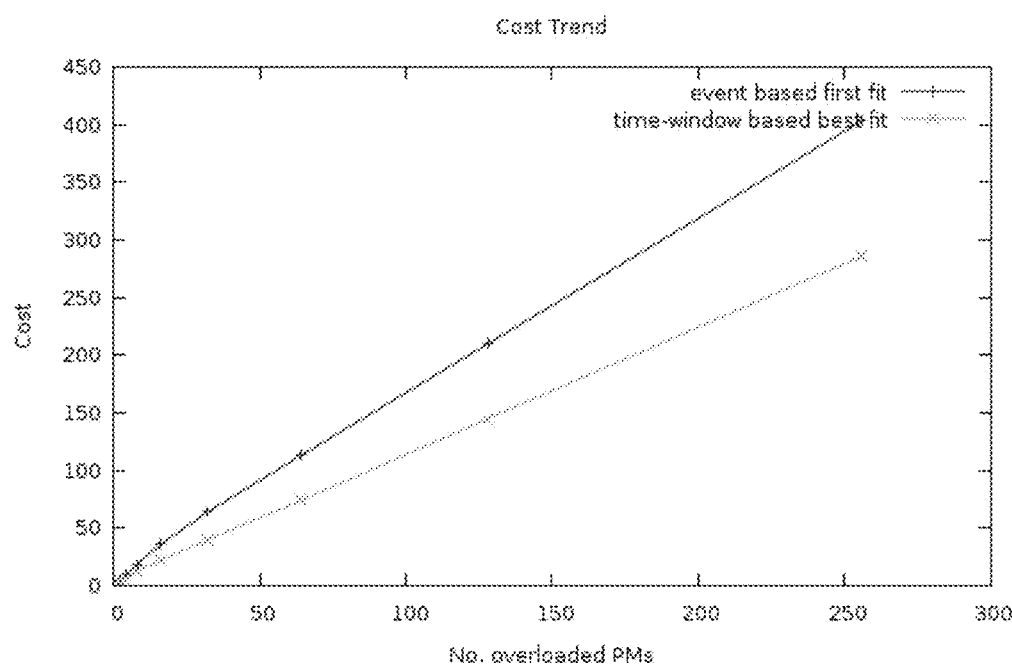
FIG. 7B is a graph to the example illustrating a trend exhibited by a Total Cost function for the example event based first fit algorithm versus the heuristic algorithm.

Rigorous experimentation was carried out over multiple instances. The metric of interest are average number of in-migrations and the average total cost generated by the two approaches—'time-window' based approach and the event-based migration. FIGS. 7A and 7B illustrate example graphs of the average number of in-migrations and the average total cost respectively generated by the 'time-window' based best fit algorithm described above as the number of overloaded PMs varied from 2 to 256 in a particular time window and each PM hosts three VMs.

For example, the average number of in-migrations was 98 when 256 different instances were generated for this example when 128 PMs were overloaded in the same time window. Again the assumption of 3 VMs per host for experimentation was not a limitation work as the number of VMs on each of the hosts can be any. It can be verified from the graph that the present system and method significantly outperforms the event based first fit algorithm in both the respects. For evaluation, it was assumed that the total number of VM migrations was same for both—the event based first fit and the time window based scheme. This ensured that the comparative analysis was based on the equals.

Figure 7C:
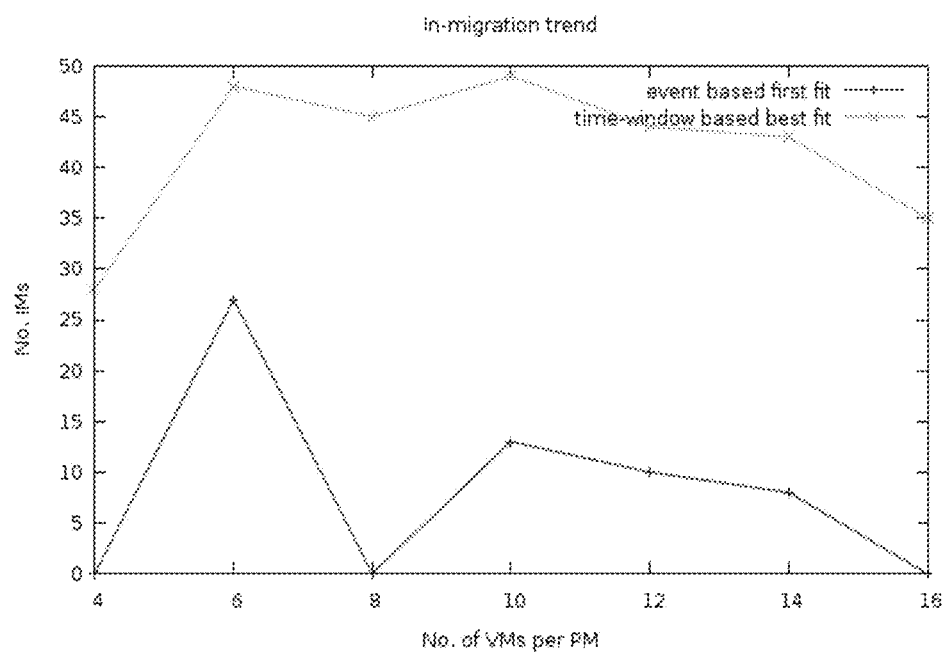
FIG. 7C is a graph to the example illustrating a comparison of the number of in-migrations as the number of VMs per PM is increased.
Figure 7D:
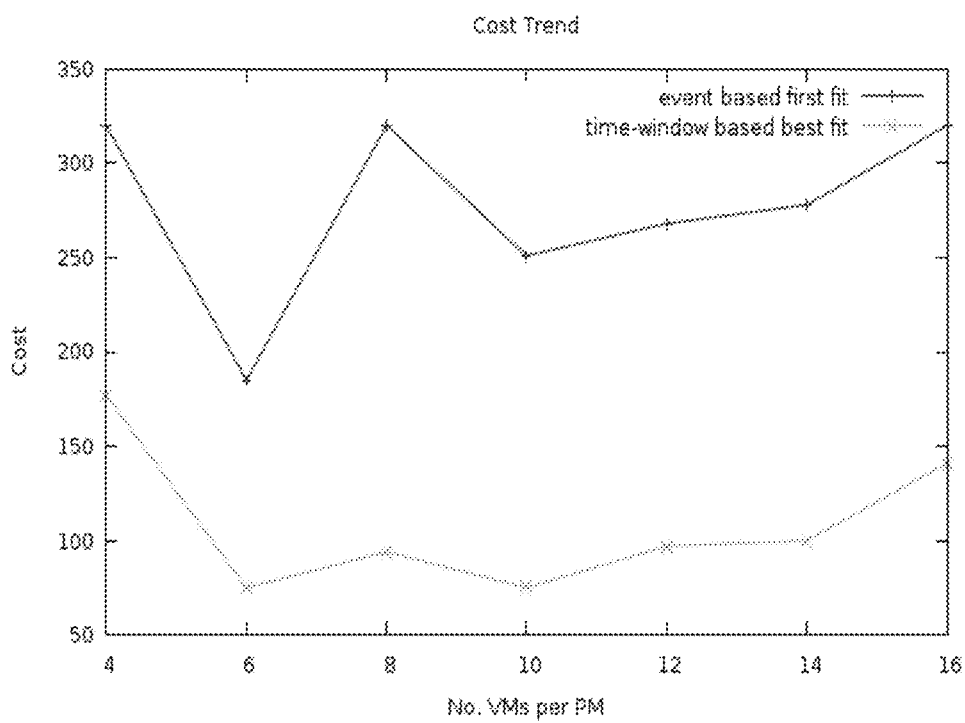
FIG. 7D is a graph to the example illustrating a comparison of the total cost as the number of VMs per PM is increased.

FIGS. 7C and 7D show the average number of in-migrations and the average total migration cost generated by the present system and method as the number of VMs hosted on each PM, in a set of 64 PMs, increased from 4 to 16. Thus, the worst scenario was when each of the 64 PMs were over-capacitated and hosted 16 VMs during the same time window. The values generated by the migration module were compared against the corresponding values for the event based first fit algorithm.

The execution time had not been reported explicitly as the largest of all the test instances generated takes a time of 135 ms approx. It can be observed that the backtracking algorithm performs well in practice even though the number of VMs is quite large. This is so because the percentage of disallowed assignments is quite high irrespective of the test instances generated thus far. The graphs in FIGS. 7A-7D and the small execution time of the proposed algorithms for large problem sets confirm that the algorithm behaves appropriately for large problem sets. The results indicate that there is no limit for applying this approaches and it is not necessary to divide the datacenter into "migration sub-regions".

While embodiments and aspects have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method of selectively migrating at least one virtual machine to another physical machine in a plurality of physical machines, the method comprising:
   receiving, by a migration management computing device, consumption data of a plurality of virtual machines and capacity data of a plurality of physical machines, the capacity data comprising an operational status indicating a powered on state or a powered down state of each one of the plurality of physical machines;
   identifying, by the migration management computing device, a first virtual machine of the plurality of virtual machines to migrate based on a consumption metric comprising a writable working set data for the first virtual machine running on a first physical machine of the plurality of physical machines;
   selecting, by the migration management computing device, a second physical machine of the plurality of physical machines to accept migration of the first virtual machine based on time window data comprising total migration time and the operational status, wherein the total migration time is based on the writable working set data for the first virtual machine;
   calculating, by the migration management computing device, a K ratio for the first virtual machine, the K ratio at least partially determined by the ratio between the consumption metric further comprising a measurement of consumption of the at least one resource dimension by the first virtual machine, and the resource dimension comprising a central processing unit (CPU) dimension or a memory dimension of the second physical machine, wherein the selecting the second physical machine of the plurality of physical machines to potentially accept migration of the first virtual machine is further based on the K ratio; and
   migrating by the migration management computing device, the first virtual machine to the second physical machine when it is determined that the first virtual machine's resource consumption does not exceed the available capacity of the second physical machine.

2. The method of claim 1, further comprising:
   iteratively calculating, by the migration management computing device, K ratios for one or more additional virtual machines of the plurality of virtual machines running on the first physical machine; and
   generating, by the migration management computing device, a first list of proposed virtual machines running on the first physical machine to be available for migration, wherein the proposed virtual machines are ordered in the first list based on their respective K ratios.

3. The method of claim 2, further comprising:
   iteratively calculating, by the migration management computing device, K ratios for one or more virtual machines of the plurality of virtual machines running on the second physical machine; and
   generating, by the migration management computing device, a second list of proposed virtual machines running on the second physical machine to be available for migration, wherein the proposed virtual machines are ordered in the second list based on their respective K ratios.

4. The method of claim 3, further comprising:
   calculating, by the migration management computing device, the available capacity of the second physical machine by performing a tentative removal of one or more of the virtual machines in the second generated list from the second physical machine;
   determining, by the migration management computing device, when the second physical machine has capacity to accept at least the first virtual machine for migration.

5. The method of claim 4, further comprising:
   removing, by the migration management computing device, the second physical machine from availability upon determining that the second physical machine does not have capacity to accept at least the first virtual machine for migration.

6. The method of claim 4, further comprising:
   assigning, by the migration management computing device, the second physical machine to a target list of available physical machines to accept one or more virtual machines for migration.

7. The method of claim 6, the method further comprising:
   determining, by the migration management computing device, when no physical machine in the target list can accept a second virtual machine, wherein the second virtual machine is in a list of proposed virtual machines; and
   assigning, by the migration management computing device, the second virtual machine to be out-migrated to a non-operational physical machine.

8. A non-transitory computer readable medium having stored thereon instructions for migrating at least one virtual machine to another physical machine in a plurality of physical machines, comprising machine executable code which when executed by at least one processor, causes the processor to perform steps comprising:
   receiving consumption data of a plurality of virtual machines and capacity data of a plurality of physical machines, the capacity data comprising an operational status indicating a powered on state or a powered down state of each one of the plurality of physical machines;
   identifying a first virtual machine of the plurality of virtual machines to migrate based on a consumption metric comprising a writable working set data for the first virtual machine running on a first physical machine of the plurality of physical machines;
   selecting a second physical machine of the plurality of physical machines to accept migration of the first virtual machine based on time window data comprising total migration time and the operational status, wherein the total migration time is based on the writable working set data for the first virtual machine;
   calculating a K ratio for the first virtual machine, the K ratio at least partially determined by the ratio between the consumption metric further comprising a measurement of consumption of the at least one resource dimension by the first virtual machine, and the resource dimension comprising a central processing unit (CPU) dimension and a memory dimension of the second physical machine, wherein the selecting the second physical machine of the plurality of physical machines to potentially accept migration of the first virtual machine is further based on the K ratio; and migrating the first virtual machine to the second physical machine when it is determined that the first virtual machine's resource consumption does not exceed the available capacity of the second physical machine.

9. The medium of claim 8, further having stored thereon instructions that when executed by the processor, cause the processor to perform steps further comprising:

iteratively calculating K ratios for one or more additional virtual machines of the plurality of virtual machines running on the first physical machine; and generating a first list of proposed virtual machines running on the first physical machine to be available for migration, wherein the proposed virtual machines are ordered in the first list based on their respective K ratios.

10. The medium of claim 9, further having stored thereon instructions that when executed by the processor, cause the processor to perform steps further comprising:

iteratively calculating K ratios for one or more virtual machines of the plurality of virtual machines running on the second physical machine; and generating a second list of proposed virtual machines running on the second physical machine to be available for migration, wherein the proposed virtual machines are ordered in the second list based on their respective K ratios.

11. The medium of claim 8, further having stored thereon instructions that when executed by the processor, cause the processor to perform steps further comprising:

calculating the available capacity of the second physical machine by performing a tentative removal of one or more of the virtual machines in the second generated list from the second physical machine;

determining when the second physical machine has capacity to accept at least the first virtual machine for migration.

12. The medium of claim 11, further having stored thereon instructions that when executed by the processor, cause the processor to perform steps further comprising:

removing the second physical machine from availability upon determining that the second physical machine does not have capacity to accept at least the first virtual machine for migration.

13. The medium of claim 11, further having stored thereon instructions that when executed by the processor, cause the processor to perform steps further comprising assigning the second physical machine to a target list of available of physical machines to accept one or more virtual machines for migration thereto.

14. The medium of claim 13, further having stored thereon instructions that when executed by the processor, cause the processor to perform steps further comprising:

determining when no physical machine in the target list can accept a second virtual machine, wherein the second virtual machine is in a list of proposed virtual machines; and assigning the second virtual machine to be out-migrated to a non-operational physical machine.

15. A migration management computing device comprising:

one or more processors;

a memory coupled to the one or more processors which are configured to be capable of executing programmed stored instructions comprising and stored in the memory to:

receive, from the memory, consumption data of a plurality of virtual machines and capacity data of a plurality of physical machines, the capacity data comprising an operational status indicating a powered on state or a powered down state of each one of the plurality of physical machines;

identify a first virtual machine of the plurality of virtual machines to migrate based on a consumption metric comprising a writable working set data for the first virtual machine running on a first physical machine of the plurality of physical machines;

select a second physical machine of the plurality of physical machines to accept migration of the first virtual machine based on time window data comprising total migration time and the operational status, wherein the total migration time is based on the writable working set data for the first virtual machine;

calculate a K ratio for the first virtual machine, the K ratio at least partially determined by the ratio between the consumption metric further comprising a measurement of consumption of the at least one resource dimension by the first virtual machine, and the resource dimension comprising a central processing unit (CPU) dimension and a memory dimension of the second physical machine, wherein the selecting the second physical machine of the plurality of physical machines to potentially accept migration of the first virtual machine is further based on the K ratio; and migrate the first virtual machine to the second physical machine when it is determined by the one or more processors that the first virtual machine's resource consumption does not exceed the available capacity of the second physical machine.

16. The device of claim 15, wherein the processor is further configured to be capable of executing programmed instructions comprising and stored in the memory to:

iteratively calculate K ratios for one or more additional virtual machines of the plurality of virtual machines running on the first physical machine; and generate a first list of proposed virtual machines running on the first physical machine to be considered for migration, wherein the proposed virtual machines are ordered in the first list based on their respective K ratios.

17. The device of claim 16, wherein the processor is further configured to be capable of executing programmed instructions comprising and stored in the memory to:

iteratively calculate K ratios for one or more virtual machines of the plurality of virtual machines running on the second physical machine; and generate a second list of proposed virtual machines running on the second physical machine to be considered for migration, wherein the proposed virtual machines are ordered in the second list based on their respective K ratios.

18. The device of claim 15, wherein the processor, when identifying the second physical machine, is further configured to be capable of executing programmed instructions comprising and stored in the memory to:

calculate the available capacity of the second physical machine by performing a tentative removal of one or more of the virtual machines in the second generated list from the second physical machine;

determine when the second physical machine has capacity to accept at least the first virtual machine for migration.

19. The device of claim 18, wherein the processor is further configured to be capable of executing programmed instructions comprising and stored in the memory to:
- remove the second physical machine from availability upon determining that the second physical machine does not have capacity to accept at least the first virtual machine for migration.

20. The device of claim 18, wherein the processor is further configured to be capable of executing programmed instructions comprising and stored in the memory to:
- assign the second physical machine to a target list of available physical machines to accept one or more virtual machines for migration.

21. The device of claim 20, wherein the processor is further configured to be capable of executing programmed instructions comprising and stored in the memory to:
- determine when no physical machine in the target list can accept a second virtual machine, wherein the second virtual machine is in a list of proposed virtual machines; and
- assign the second virtual machine to be out-migrated to a non-operational physical machine.

* * * * *